July 7, 1953     W. J. LEWKOWSKI, JR     2,644,921
MAGNETIC TESTING APPARATUS
Filed Aug. 25, 1951
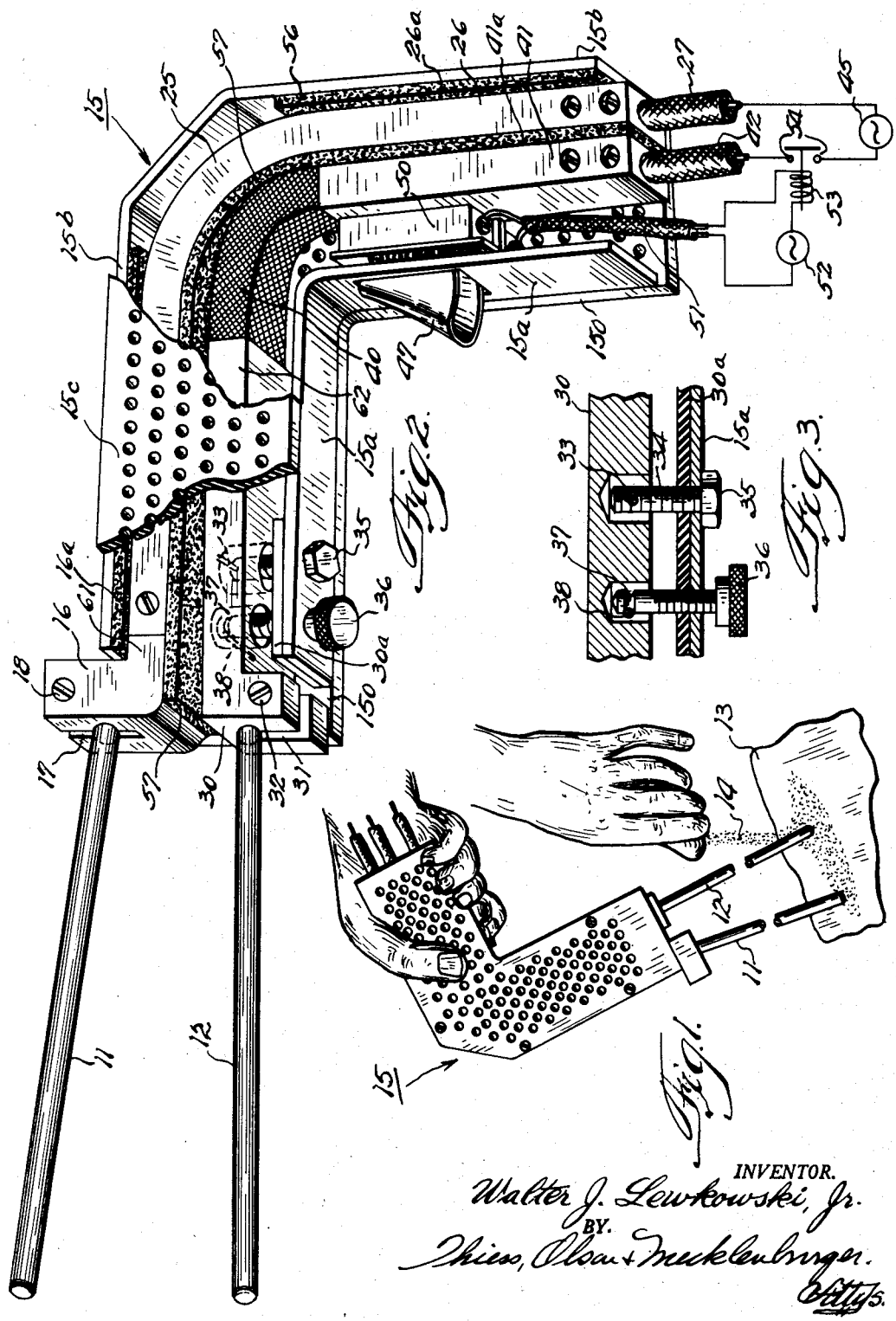
INVENTOR.
Walter J. Lewkowski, Jr.
BY
Thiess, Olson + Mecklenburger

UNITED STATES PATENT OFFICE 2,644,921

MAGNETIC TESTING APPARATUS

Walter J. Lewkowski, Jr., Calumet City, Ill.

Application August 25, 1951, Serial No. 243,720

2 Claims. (Cl. 324—38)

This invention relates to apparatus for facilitating magnetic testing and it is an object of the invention to provide improved apparatus of that character.

It is common practice to subject metal work which has been welded, cast or otherwise formed to a magnetic test to determine whether there are any cracks, blow-holes or other defects therein. This test is performed by passing an electric current through the metal work and sprinkling iron filings on the surface thereof, the current in the metal work setting up a magnetic field to which the iron filings are responsive. Any defects in the metal work causes the current to flow in an indirect path and otherwise distorts the magnetic field. These distortions appear on the surface in the distribution of the iron filings whereby the defects in the metal work may readily be detected by an experienced operator. As indicated above the performance of such a test is very common in the metal working art and is one which is of great value in determining the soundness of metal work.

Apparatus for performing such tests has, until the present time, been awkward to handle and has therefore resulted in unnecessary consumption of time in the performance of such tests. Most commonly, the apparatus includes individual power leads with clamps for securing the leads to various points on a piece of metal work to be tested. Additional apparatus is required for switching and controlling electric power to be supplied to such leads. Frequently numerous individual operations are necessary in the performance of such a test, the individual operations necessarily being performed in sequence and thereby consuming a considerable amount of time.

It is another object of the invention to provide improved apparatus for facilitating magnetic testing.

It is another object of the invention to provide magnetic testing apparatus which may be operated by one hand whereby the other hand of an operator is free to scatter filings on the surface of the work being tested.

It is another object of the invention to provide improved magnetic testing apparatus which may be handled with one hand of an operator, the apparatus being readily adjustable to vary the length of the current path through the work being tested.

It is another object of the invention to provide improved magnetic testing apparatus having the advantages described above while being durable, economical, and simple to operate.

This invention, together with further objects and advantages thereof, will best be understood by reference to the following description taken in connection with the accompanying drawing, and its scope will be pointed out in the appended claims.

In the drawing, in which like parts are designated by like reference numerals,

Fig. 1 is a perspective view showing the application of testing apparatus illustrating one embodiment of the invention;

Fig. 2 is a greatly enlarged perspective view of the apparatus with certain portions partially broken away; and Fig. 3 is a detailed cross-sectional view of one portion of the apparatus illustrated in Figs. 1 and 2.

The illustrated embodiment of the invention includes a pair of elongated contacts 11 and 12, the ends of which are intended to be brought into contact with metal work 13 which is to be magnetically tested as illustrated in Fig. 1. In the latter figure, it will be seen that the testing apparatus may be operated with one hand whereby the other hand of the operator is free to scatter iron filings 14 on the surface of the metal work 13. All of the steps necessary to the performance of the test may thereby be performed simultaneously with resultant saving in labor and time.

The other ends of the contacts 11 and 12 are secured in a body member or supporting means 15 which is in the form of a pistol in order to permit one hand operation. The inner and outer walls 15a and 15b of the body 15 are preferably of metal in the interest of strength and rigidity, while the side walls 15c are preferably of insulating material such as plastic or heavy fiberboard, these side walls preferably being perforated to facilitate the dissipation of heat.

Referring to Fig. 2, it will be seen that the right-hand end of the contact 11 is secured in a clamp 16, the clamp having a slot 17 to provide flexibility, and a screw 18 by means of which the clamp may be made to grip firmly the contact 11. The clamp 16 extends to the right into the body member 15 and is secured to the outer wall 15b thereof by any suitable means, not shown in the drawing. The clamp 16 is preferably insulated from the outer wall 15b by a sheet of insulating material 16a. The screws or other means employed for securing the clamp 16 to the wall 15b are preferably of such form that the clamp remains insulated from the wall. Such construction is common in the art and accordingly is not shown or described in detail herein.

A rigid conducting bar 25 is electrically connected to the right-hand end 61 of the clamp 16 by any suitable means such as a screw or tongue and groove joint (not shown). Bar 25 extends to the right and downwardly and terminates in a socket member 26 for receiving a lead 27 as shown. The socket member 26 is also insulated from the outer wall 15b by a sheet of insulating material 26a.

The elongated contact 12 is secured at its right-hand end in Fig. 2 to a clamping member 30 having a slot 31 and a clamping screw 32 as shown. The clamp 30 is pivotally mounted on a pin 33 which is in turn supported by a post 35. The contact 12 is thereby pivotable toward and away from the contact 11 to increase or decrease the distance between the exposed or free ends of the contacts.

A screw 36 which threadedly engages the inner wall 15a of the body member 15 passes upwardly through a drilled hole in the clamp 30, the screw 36 having an annular recess 37 as may best be seen in Fig. 3. Another pin 38 is secured within the clamp 30 and passes through the recess 37 in the screw 36, thereby preventing axial movement of the screw 36 with respect to the clamp 30. Accordingly, as the screw 36 is rotated, whereby it is moved inwardly or outwardly of the supporting means 15 by virtue of its threaded connection with the inner wall 15a thereof, the clamp 30 will be pivoted about the pin 33. The screw 36 may thereby be used to control the position of the free end of the contact 12 with respect to the free end of the contact 11 as suggested above.

The clamp 30 is preferably insulated from the inner wall 15a and an insulating sheet 30a is provided for this purpose. The post 35 and the screw 36 may be of nonconducting material or other obvious means may be employed to insulate the clamp 30.

The right-hand end 62 of the clamp 30 is electrically connected to a flexible insulated cable 40 which extends to the right and downwardly and terminates in a socket 41 for receiving another lead 42, the socket 41 being insulated from the adjacent socket 26 by a sheet of insulating material 41a. Cable 40 and clamp 30 are both insulated from bar 25 and clamp 16 by insulating material 57 disposed therebetween.

The two leads 27 and 42 are preferably connected to a suitable generator 45 for supplying the necessary testing current. The generator must be one which can supply a large current at low voltage and may be, for example, a welding generator. This is particularly convenient in instances wherein the testing apparatus is being employed to test welds.

The supply of power to the testing apparatus is preferably controlled by a trigger 47 which is pivotally mounted on the pistol-shaped body member 15 in a position to be operated by one finger as suggested in Fig. 1.

In the particular embodiment of the invention illustrated a toggle switch 50 is provided immediately adjacent the trigger 47 and is operable thereby. The operating connections between the trigger 47 and the toggle switch 50 may be of any suitable form and accordingly, are not shown in detail in the drawing. In the interest of safety it is preferred that when the trigger 47 is depressed, the contacts 11 and 12 are energized, and when the trigger is released, the contacts are again de-energized.

The switch 50 is shown in Fig. 2 as being connected to control leads 51. When the switch 50 is closed, it completes a circuit including a source of electric power 52 and the operating coil 53 of a relay. When the relay coil 53 is energized by depressing the trigger 47 and closing the switch 50, relay contacts 54 are made to close and thereby to connect the lead 42 to the generator 45.

It will now be seen that magnetic testing apparatus has been disclosed which permits operation with only one hand of the operator. More specifically, with the disclosed apparatus an operator may with one hand apply a voltage between two selected points on the surface of metal work to be tested, the same hand controlling the energization of the contacts. The operator's other hand is, accordingly, free to sprinkle iron filings on the surface of the work to be tested, and the entire test operation may thereby be performed as a single operation. Furthermore, the contacts may be applied to the work to be tested at variably spaced points by virtue of the simple adjustment provided for varying the distance between the exposed or free ends of the contacts.

While a particular embodiment of the invention has been shown, it will be understood, of course, that the invention is not limited thereto since many modifications may be made, and it is, therefore, contemplated to cover by the appended claims any such modifications as fall within the true spirit and scope of the invention.

The invention having thus been described, what is claimed and desired to be secured by Letters Patent is:

1. A magnetic tester comprising a pistol-shaped body member, a first pair of elongated leads extending from the muzzle portion of said body member, each of said leads having an exposed free end, adjusting means interconnecting said body member and one of said leads for controlling the position of the exposed end of said one lead with respect to the exposed end of the other of said leads, a second pair of electrical leads connected respectively to said first pair of leads and extending through said body member and out of the butt portion thereof, and control means on said body member operable as a trigger for controlling electrical energization of said leads.

2. A magnetic tester comprising an elongated body member, a first pair of elongated leads extending from a forward end of said body member, each of said leads having an exposed free end, adjusting means interconnecting said body member and one of said first pair of leads for controlling the position of the exposed end thereof with respect to the exposed end of the other of said first pair of leads, said means comprising a pivotal member engageable with one of said first pair of leads and a locking member engageable with said body member for holding said pivotal member in fixed position with respect to said body member, a second pair of electrical leads connected respectively to said first pair of leads and extending through said body member and out of a rearward end thereof, and switch means on said body member for controlling electrical energization of said leads.

WALTER J. LEWKOWSKI, Jr.

References Cited in the file of this patent

UNITED STATES PATENTS

| Number | Name | Date |
|---|---|---|
| 1,804,380 | Sperry | May 5, 1931 |
| 2,136,375 | De Forest | Nov. 15, 1938 |
| 2,142,619 | Sciaky | Jan. 3, 1939 |
| 2,158,409 | De Forest et al. | May 16, 1939 |
| 2,225,179 | Oglevee | Dec. 17, 1940 |
| 2,423,552 | Clarke | July 8, 1947 |